July 26, 1932.　　　A. F. JENKINS　　　1,869,260
METHOD OF FABRICATING TIPS FOR TORCHES
Filed Dec. 4, 1931
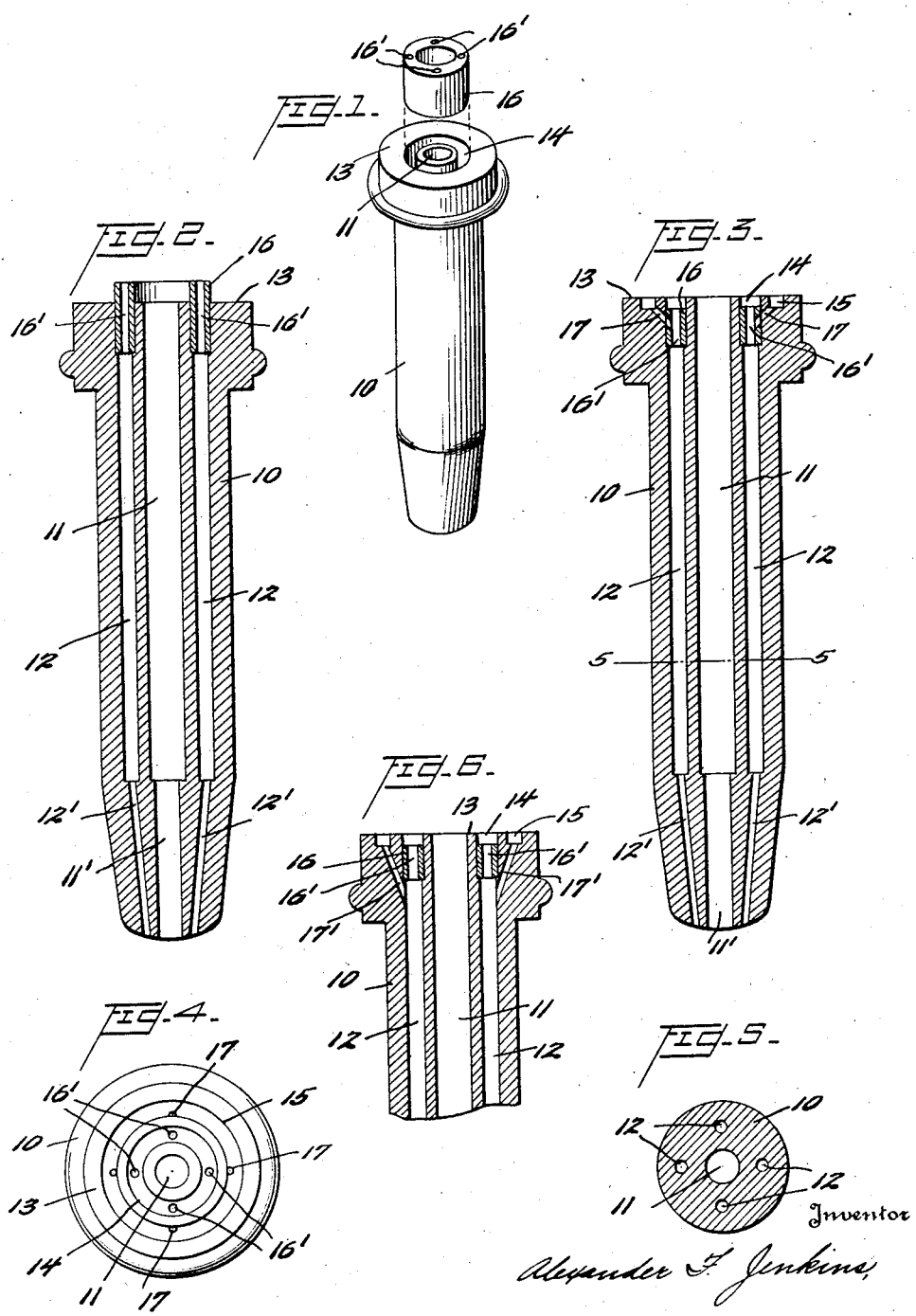

Patented July 26, 1932

1,869,260

UNITED STATES PATENT OFFICE

ALEXANDER F. JENKINS, OF BALTIMORE, MARYLAND

METHOD OF FABRICATING TIPS FOR TORCHES

Application filed December 4, 1931. Serial No. 579,032.

This invention relates to methods of fabricating tips for cutting or welding torches and particularly to methods of making tips having passages therein for the mixing of combustible and combustion supporting gases.

In the manufacture of welding and cutting tips, it is generally customary to form in each a plurality of conduits for combustible gas so that a series of jets of combustible gas may issue from the discharge end of the tip. Generally also these conduits are disposed equidistantly from each other and equidistantly from the axis of the tip; that is, they are disposed in a circular series in regular order. Finally, for convenience in manufacture and efficiency in operation, it is generally preferred to have the several outlets of these passages of relatively small size, the intermediate portions thereof of relatively large diameter, and the inlet ends again somewhat restricted.

In accordance with the present invention, I provide a method whereby a tip of this type may be easily and cheaply manufactured. The invention contemplates the insertion into an annular groove formed in the seating surface of the tip of a member provided with a series of restricted apertures therethrough, one such restricted aperture being provided for each of the conduits in the tip and the member being so inserted as to be frictionally retained in position with each of its restricted apertures disposed coaxially, or in register, with one of the longitudinal gas passages in the main portion of the tip. By the insertion of a single member, therefore, all of the longitudinally extending conduits of the tip are simultaneously restricted at their rear or inlet ends.

The accompanying drawing includes several views which disclose the various steps followed in the manufacture of the tip. In the drawing:

Figure 1 is an exploded view of the tip and the ring just prior to insertion of the latter;

Figure 2 is an axial section through the tip after insertion of the ring-like restricting device;

Figure 3 is a similar section through the completed tip;

Figure 4 is a plan view of the seating surface of the completed tip;

Figure 5 is a section on line 5—5 of Figure 3; and

Figure 6 is an axial section through a tip having an inserted ring but a slightly different arrangement of gas passages.

The tip illustrated in Figures 1 to 5, inclusive, comprises a main or body portion 10 through which extend a plurality of gas passages, the central passage 11 being in this instance provided for the transmission of cutting oxygen to the discharge end, and the forward end 11' of this passage being restricted as shown. In welding tips, such passages are, of course, omitted. Disposed equidistantly from the axis of the tip are a plurality of ducts or passages 12 for the transmission of combustible gas to the discharge end, each of these passages having a restricted forward portion 12' which is preferably forwardly inclined toward the oxygen conduit discharge port, as shown. The several conduits 12 are disposed in a circular series around the axis of the tip and are also preferably disposed equidistantly from each other, as may be seen in Figures 4 and 5.

The seating surface of the tip is indicated at 13 and may comprise either a flat circular surface, such as that shown, or a conical surface. In this seating surface 13 are formed two concentric grooves indicated at 14 and 15 respectively, groove 14 being so placed as to be intersected by all of the heating or combustible gas passages 12, and groove 15 being disposed just outside of groove 14. As will be seen from Figure 3, the bottom of groove 14 comprises the annular outer end surface of a ring 16, and this ring is provided with relatively restricted ports 16' formed therein for the transmission of gas from the groove 14 to the several heating gas conduits 12, the various ports 16' being in register or axial alignment respectively with the several heating gas passages. A diagonal passage 17 extends outwardly from each such restricted port 16' to the bottom of annular groove 15, each such passage penetrating the outer wall of ring 16, as shown. Mixture of the gases flowing through ports 16' and 17, therefore, first occurs in the lower ends of ports 16'.

The method of assembling the tip and ring, which are formed separately in the first instance, will now be described. An incompleted tip is shown in Figure 1, together with the ring adapted for assembly therewith. The groove in the seating surface 13, which is intended to receive the ring 16, is so formed and so dimensioned that the ring must be necessarily inserted under the influence of a considerable amount of pressure. In inserting the ring, however, care must be taken in order to make certain that the several ports 16' formed therein are in exact register with the corresponding conduits 12 in the tip. When fully seated in position, the rear end of the ring projects above the seating surface of the tip as shown in Figure 2. The next step is to remove, by a suitable operation, that portion of the ring which projects beyond the seating surface and also a considerable portion thereof which lies below the seating surface, the ring being cut away until its annular outer end surface lies in the position in which it is shown in Figure 3. This removal of metal may be effected in various ways but preferably by means of a lathe. The ring so positioned is inaccessible and cannot be knocked loose. By reason of the heavy frictional engagement between the walls of the ring and the sides of the groove in which it is placed, it will remain in the position shown indefinitely despite hard usage of the tip. Finally, the groove 15 is turned in the seating surface and the diagonal passages 17 drilled so that the gases which pass from the head of the torch into grooves 14 and 15 respectively are brought together in the restricted channels 16'.

In the form of the invention shown in Figure 6, the diagonal gas passages 17' are so drilled that they intersect the enlarged bores 12 below the ring 16, so that mixing first occurs below the ring. It is preferred, however, that the diagonal bores intersect the restricted ports 16' in the ring 16, and better mixing results.

Having thus described the invention, what is claimed as new and desired to be secured by Letters Patent is:—

1. The method of fabricating a tip for a torch which comprises forming a plurality of substantially parallel ducts in the body thereof, forming a groove in the end of the tip which intersects said ducts, pressing a member into said groove, said member having a plurality of ducts formed therein which register, when said member is finally positioned, with the ducts formed in the body of the tip, the ducts in said member being of less cross-sectional area than the corresponding ducts of the body, and removing by a cutting operation a portion of the outer end of said member until its outer end surface occupies a predetermined relationship to the adjacent end surface of the tip body.

2. The method of fabricating a tip for a torch which comprises forming a plurality of substantially parallel ducts in the body thereof, said ducts being equidistantly spaced from a common axis, forming an annular groove in the end of said body centered on said common axis, said groove intersecting each duct, pressing a cylindrical sleeve into said groove, said sleeve having a plurality of ducts formed therein extending parallel to said axis, the ducts of the sleeve registering with the ducts of the tip body but being of less cross-sectional area, and removing by a cutting operation a portion of the outer end of the sleeve so that its annular outer end surface forms the bottom of said groove.

In testimony whereof I hereunto affix my signature.

ALEXANDER F. JENKINS.